Patented Nov. 10, 1931

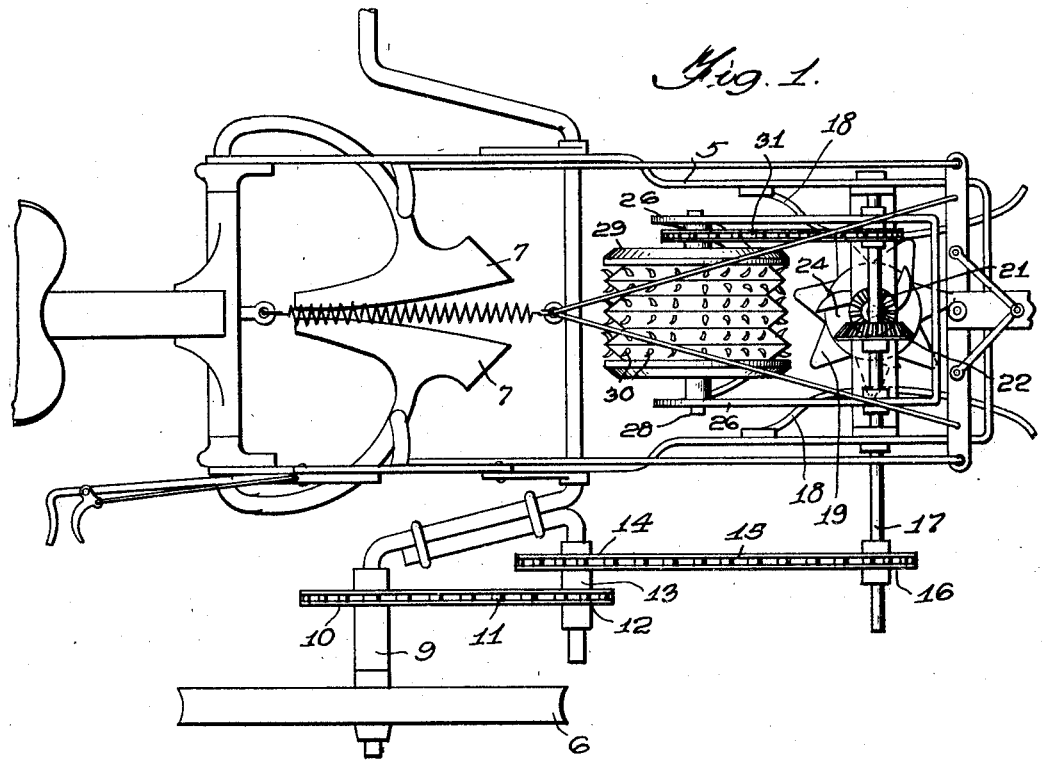

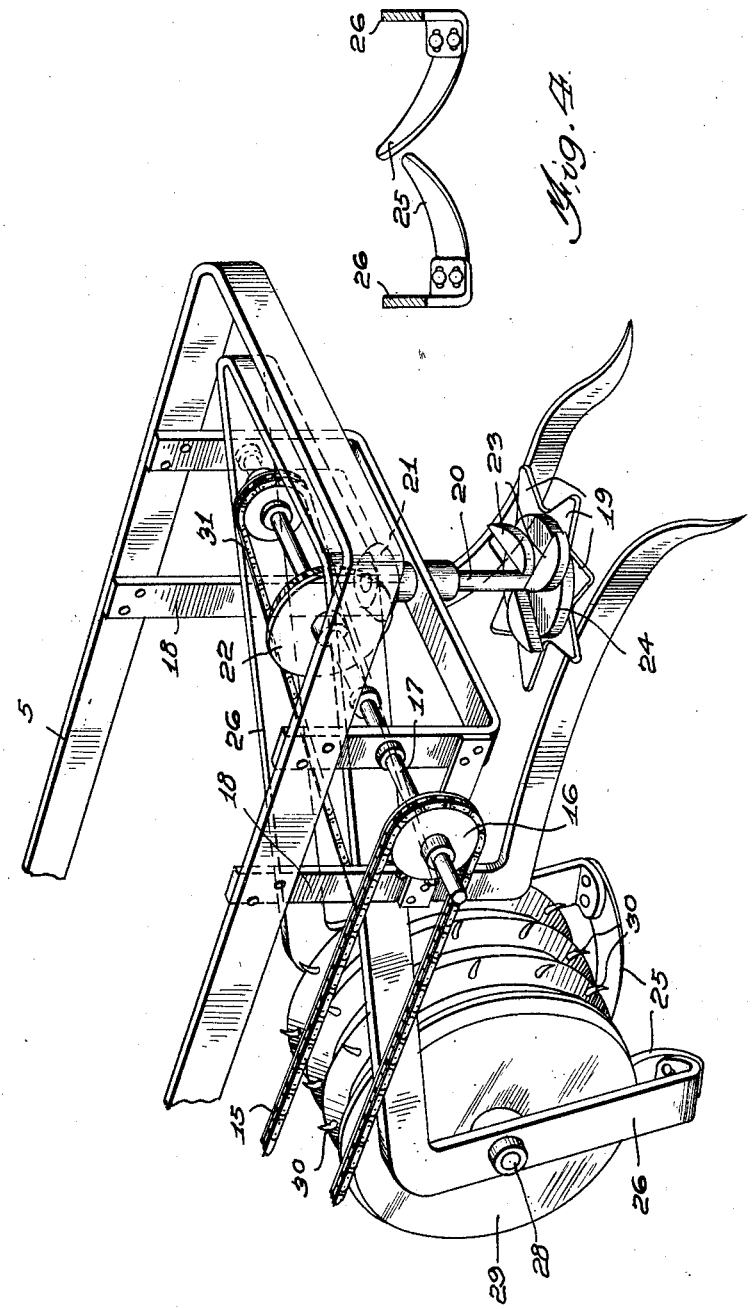

1,831,658

UNITED STATES PATENT OFFICE

AUGUST GROENIG AND GEORGE H. HOBBS, OF RUPERT, IDAHO, ASSIGNORS OF ONE-THIRD TO R. W. HUDELSON AND H. B. REDFORD

BEET TOPPER

Application filed October 24, 1927. Serial No. 228,399.

This invention relates to a beet topping attachment for beet digging machines, and it has for its object to provide a combination and correlation of parts, adapted to remove the leaves from the beets and top the beets in a more expeditious and effective manner than has heretofore been possible.

In the accompanying drawings:

Fig. 1 is a plan view of a conventional type of beet digging machine, having the topper of the present invention applied thereto, Fig. 2 is a side elevation, Fig. 3 is a fragmentary perspective view, and Fig. 4 is a detail view of the topping knives, hereinafter described.

Like numerals designate corresponding parts in all of the figures of the drawings.

The conventional beet lifter or digger, upon which, for purposes of illustration, we have shown our attachment, comprises a conventional frame 5, ground wheels 6, and lifting shovels or blades 7. In carrying out the invention we mount on an extension 9 of the hub of one of the ground wheels, a sprocket wheel 10, which drives through a sprocket chain 11, to a smaller sprocket wheel 12 upon a hub 13. This hub 13 carries a larger sprocket wheel 14, which drives by sprocket chain 15 to a sprocket wheel 16, on a main transverse drive shaft 17. Suspended from the frame 5 is a pair of sickle prongs 18, the forward ends of which are shaped to engage the beets and lift the leaves of the beets. The leaves slide rearwardly over the upper surfaces of the sickle prongs, where they are severed by revolving blades 19, which act over and co-act with the upper surfaces of the sickle prongs. The blades 19 are carried by a vertical shaft 20, which is driven by bevel pinion 21, and bevel gear wheel 22, from the transverse drive shaft 17. Tangentially disposed blocks 23, mounted upon the upper surface of disc 24, by which the revolving blades 19 are carried, act to throw the severed leaves laterally and out of the path of movement of the oppositely projecting and overlapping topping or top severing knives 25. These knives lie in substantially horizontal planes, and project toward each other, and in somewhat staggered relation, from the lower end of L-shaped bars 26, the long arms of which swing from shaft 17. Thus these bars comprise a frame which is adapted to rise and fall with the contour of the beet row. A transverse shaft 28, which extends laterally between the L-shaped bars 26, constitutes a mounting for a relatively wide corrugated wheel 29, the periphery of which is studded with prongs 30. This wheel is driven by sprocket gearing 31, from the main transverse drive shaft 17. Its function is to engage the beets and hold them in such manner that the knives 25 may readily sever the tops of the beets. That is to say, if the wheel 29 were omitted, there would be a tendency for the knives 25 to drag the beets out of the ground, rather than to clearly and cleanly sever their tops. To counteract any such possibility the wheel 29 constituting means independent of and in addition to the knives is provided. It is to be noted that the direction of rotation of the wheel 29 with respect to the bodily movement of the machine is to cause the spikes 30 thereof to thrust the tops of the beets toward the knives. Thus, it may be said that the wheel 29 and its spikes constitute means for engaging the beets and backing up the same against the action of the severing knives, and the rearward thrust upon the beets is a decided one, this being brought about by causing the rate of rotation of the wheel 29 to be at such speed as to more than compensate for the bodily forward movement of the wheel with the machine in its travel.

Thus, the center of the wheel or roller is at the center of the beet crown at the time the knives take hold of the beet and begin the cutting operation. The accelerated speed of the roller causes its spikes to continue to engage and hold the beet top in place until the roller has passed off, and the knives have completed the cutting operation.

It is apparent that many ways will readily suggest themselves to those skilled in the art for carrying out the objects of the invention.

Therefore, it is to be understood that the invention is not limited to the precise construction set forth, but that it includes within its purview whatever changes fairly come within either the terms or the spirit of the appended claims.

Having described our invention, what we claim is:

1. The combination with a wheeled travelling frame, of means for severing the tops of beets carried thereby, and a leaf removing means carried by said travelling frame in advance of the topping means and in position to complete the severing of the leaves from the beets prior to the engagement of the topping mechanism therewith, said leaf removing means comprising a pair of spaced sickle bars having downturned forward ends and substantially horizontal upper edges, a horizontally rotative knife lying between said sickle bars and supported upon a vertical shaft, said knife comprising a plurality of blades which move in contact with the upper edges of said sickle bars for severing the leaves, and leaf engaging means carried by the vertical shaft above the said blades and acting to throw the severed leaves laterally beyond the sickle bars.

2. The combination with a beet topper, comprising oppositely projecting and overlapping severing knives adapted to engage and sever the top of the beet, of means carried by the beet topper and independent of the knives for engaging the top of the beet and holding it against the forward thrust of the knives during the severing action.

3. A machine of the character described comprising a wheeled frame, oppositely projecting and overlapping beet topping knives carried thereby, a movable element adapted to engage the tops of the beets and means for moving said element to exert a rearward thrust upon the beets during the severing action, the action of said element being independent of the cutting action of the knives.

4. A device of the character described, comprising a wheeled traveling frame, a pair of oppositely projecting and overlapping topping knives carried thereby, a rotative element carrying prongs adapted to axially penetrate the tops of the beets and means for imparting movement to said rotative element to cause it to exert a rearward thrust upon the beets to counteract the thrust of the knives during the topping action.

5. A device of the character described comprising a wheeled traveling frame, a floating frame carried thereby, oppositely projecting and overlapping topping knives carried by the floating frame and a rotative element carried by the frame and moving with the knives, said rotative element carrying members adapted to axially penetrate the tops of the beets and thrust them toward the knives during the topping action.

6. The combination with a wheeled frame, of a transverse main driving shaft carried thereby, means for driving said shaft from one of the ground wheels of the frame, a vertical shaft driven from the transverse shaft, cutter blades carried thereby, a pair of spaced sickle prongs supported from the frame, over which said blades act, a vertically swinging frame, a wheel mounted in the vertically swinging frame to travel along the ground, means for driving said wheel from the transverse shaft, prongs upon the periphery of the last named wheel adapted to axially penetrate the beets and topping knives supported from the swinging frame, below and rearwardly of said wheel, said cutting blades severing the leaves from the beets prior to the topping action and said pronged wheel engaging and exerting a thrust upon the beets in opposition to the thrust of the topping knives during the topping operation.

7. A machine of the character described, comprising a wheeled travelling frame, beet topping knives carried thereby adapted to engage and slice the tops of the beets wholly under the forward travel of said travelling frame, a rotative element carrying prongs mounted upon said wheeled frame and in such juxtaposition to the topping knives, that its prongs may engage the beets and thrust them toward the knives during the topping operation, and a leaf severing means carried by the travelling frame at such distance in advance of the topping knives as to complete the removal of the leaves prior to the engagement of the topping knives with the beets.

8. The combination with a wheeled travelling frame, of means for severing the tops of beets carried thereby, and a leaf removing means carried by said travelling frame in advance of the topping means and in position to complete the severing of the leaves from the beets prior to the engagement of the topping mechanism therewith, said leaf removing means comprising a pair of spaced sickle bars having downturned forward ends and substantially horizontal upper edges, and a horizontally rotative knife lying between said sickle bars and supported upon a vertical shaft, said knife comprising a plurality of blades which move in contact with the upper edges of said sickle bars for severing the leaves, and a plurality of tangentially disposed blocks upon the upper face of the knife shaped to engage the severed leaves and throw them laterally beyond the sickle bars.

In testimony whereof they affix their signatures.

AUGUST GROENIG.
GEORGE H. HOBBS.